(12) United States Patent  
Shine et al.

(10) Patent No.: US 11,605,839 B2
(45) Date of Patent: Mar. 14, 2023

(54) BATTERY SYSTEM

(71) Applicant: Anduril Industries Inc., Irvine, CA (US)

(72) Inventors: Jonathan Mitchell Shine, Costa Mesa, CA (US); John Henry Harris, III, Anaheim, CA (US); Christopher Joseph Dycus, Aliso Viejo, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 152 days.

(21) Appl. No.: 16/786,529

(22) Filed: Feb. 10, 2020

(65) Prior Publication Data

US 2021/0249701 A1 Aug. 12, 2021

(51) Int. Cl.
| | |
|---|---|
| *H01M 10/42* | (2006.01) |
| *H01M 10/46* | (2006.01) |
| *H01M 10/615* | (2014.01) |
| *H01M 50/20* | (2021.01) |

(52) U.S. Cl.
CPC ..... *H01M 10/4257* (2013.01); *H01M 10/465* (2013.01); *H01M 10/615* (2015.04); *H01M 50/20* (2021.01)

(58) Field of Classification Search
None
See application file for complete search history.

(56) References Cited

U.S. PATENT DOCUMENTS

| | | | | |
|---|---|---|---|---|
| 2008/0106235 A1* | 5/2008 | Huang | ............... | H02H 7/18 320/157 |
| 2011/0014501 A1* | 1/2011 | Scheucher | ............... | B60L 53/11 429/7 |
| 2012/0032638 A1* | 2/2012 | Jung | ............... | H01M 10/486 320/112 |
| 2012/0080941 A1 | 4/2012 | Scheucher | | |
| 2013/0221919 A1 | 8/2013 | Gallegos | | |
| 2014/0176079 A1 | 6/2014 | Ito | | |
| 2015/0194707 A1* | 7/2015 | Park | ............... | H02J 7/007182 429/61 |
| 2016/0359329 A1 | 12/2016 | Kim | | |
| 2017/0054134 A1* | 2/2017 | Choi | ............... | G01R 31/3648 |
| 2017/0207637 A1* | 7/2017 | Sugeno | ............... | H02J 3/32 |

(Continued)

FOREIGN PATENT DOCUMENTS

| | | |
|---|---|---|
| TW | 201203780 | 1/2012 |
| WO | 2017173420 | 10/2017 |

*Primary Examiner* — Amanda J Barrow
(74) *Attorney, Agent, or Firm* — Van Pelt, Yi & James LLP

(57) ABSTRACT

A battery system includes a power bus and a set of battery packs. A battery pack is one or more batteries, a sensor board, and a power board. The power bus is used to electrically connect the set of battery packs. The sensor board receives a voltage difference between a battery pack not connected to the power bus and the power bus; determines whether the voltage difference indicates that a battery pack voltage is too high compared to a power bus voltage; in response to determining the voltage difference indicates that the battery pack voltage is too high compared to the power bus voltage, provides a drain indication to drain off the battery pack using a power draw mechanism until the voltage of the battery pack is within a threshold voltage difference of the power bus; and provides a connect indication to connect the disconnected battery pack to the power bus.

16 Claims, 12 Drawing Sheets

(56) References Cited

U.S. PATENT DOCUMENTS

| | | |
|---|---|---|
| 2018/0056805 A1 | 3/2018 | Shen |
| 2018/0212213 A1* | 7/2018 | Kawai .................. H01M 4/505 |
| 2018/0354375 A1* | 12/2018 | Dao ................. H02J 7/007192 |
| 2019/0123567 A1* | 4/2019 | Kaneko ............... H01M 10/482 |
| 2020/0059106 A1* | 2/2020 | Karlsson ................. B60L 58/22 |
| 2020/0176829 A1* | 6/2020 | Nishikawa .......... H01M 10/482 |
| 2021/0135461 A1* | 5/2021 | Wang ................. H01M 10/425 |

* cited by examiner

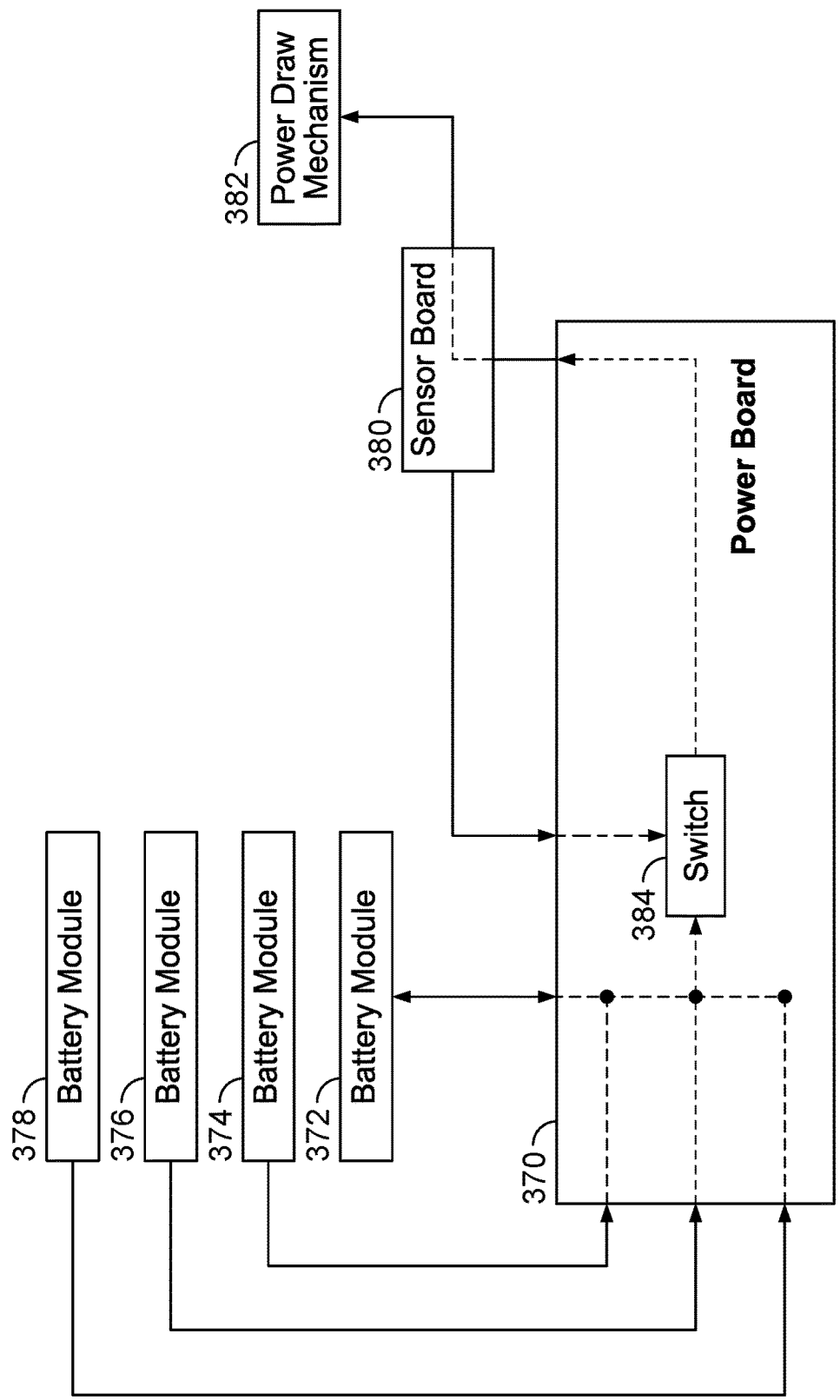

BATTERY SYSTEM

BACKGROUND OF THE INVENTION

Connecting batteries in parallel increases total current capacity by decreasing total resistance, and it also increases overall amp-hour capacity. However, unless all battery packs in a parallel bank all have the same voltage prior to connection, overcurrent conditions may result in equipment damage and/or personal injury. For battery systems deployed in the field, it is not possible without considerable effort and expense to precisely match pack voltages prior to connection given the changes that occur to each battery pack's state of charge during transport or storage. Existing balancing and charging solutions are often complex, costly, time and/or labor intensive, and therefore impractical for powering critical systems in remote locations.

BRIEF DESCRIPTION OF THE DRAWINGS

Various embodiments of the invention are disclosed in the following detailed description and the accompanying drawings.

FIG. 3C is a block diagram illustrating an embodiment of a sensor-board controlled switch used to connect one or more battery modules to a bleed resistor.

DETAILED DESCRIPTION

Figure 1A:
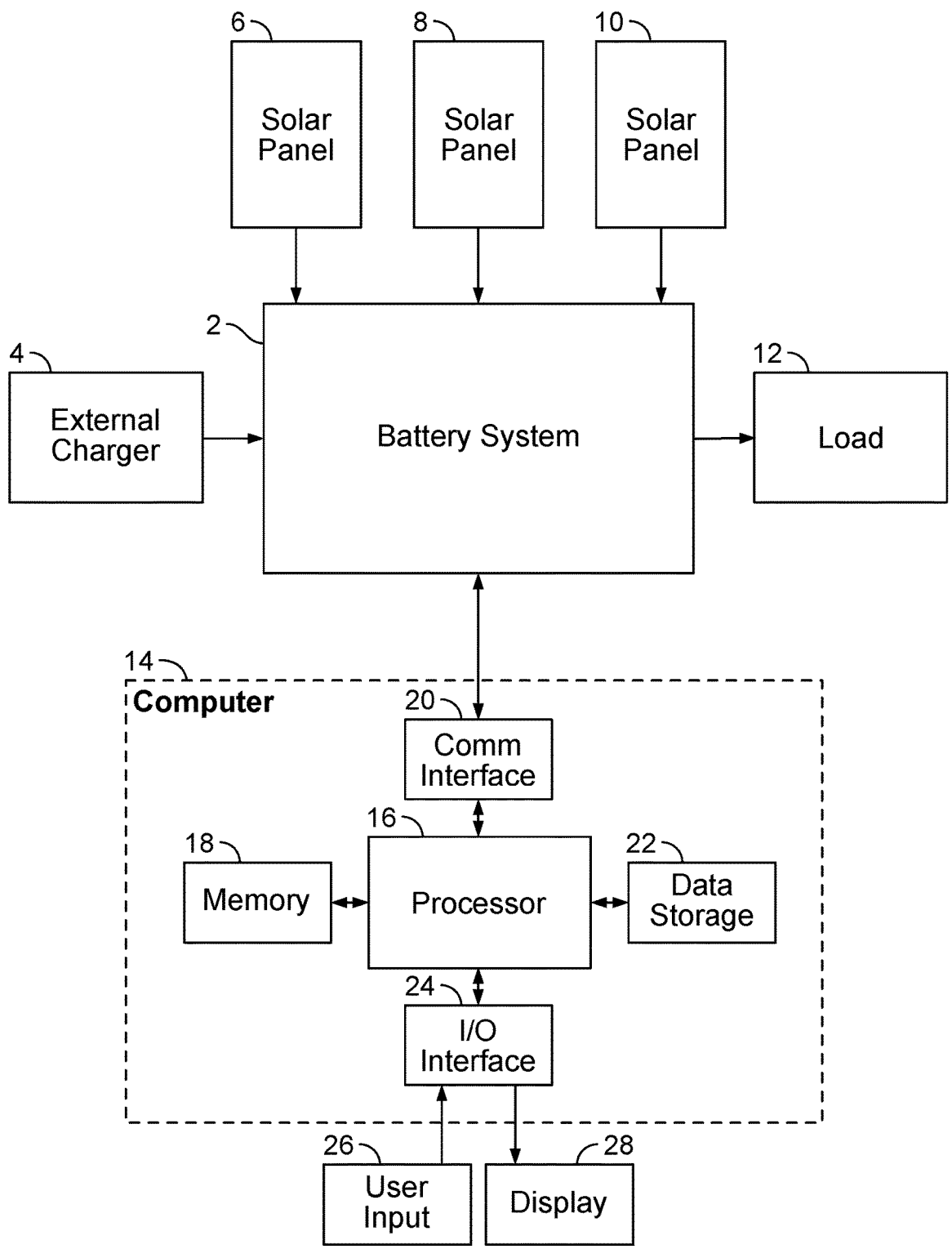
FIG. 1A is a block diagram illustrating an embodiment of a battery system powering a load.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A self-balancing battery system is disclosed. The system comprises a power bus and a set of battery packs. A battery pack of the set of battery packs comprises one or more batteries, a sensor board, and a power board. The power bus of the battery system is used to electrically connect the set of battery packs. The sensor board of a battery pack of the set of battery packs receives a voltage difference between a battery pack not connected to the power bus and the power bus; determines whether the voltage difference indicates that a battery pack voltage is too high compared to the power bus voltage; in response to determining the voltage difference indicates that the battery pack voltage is too high compared to the power bus voltage, provides a drain indication to drain off the battery pack using a power draw mechanism until the voltage of the battery pack is within a threshold voltage difference of the power bus; and provides a connect indication to connect the disconnected battery pack to the power bus.

In some embodiments, in response to the battery pack voltage being too low, signals are sent over the communication bus to the other pack that is connected to the bus to disconnect itself, and then the first pack connects itself.

In some embodiments, a battery system comprises a power bus and a set of battery packs. A battery pack of the set of battery packs comprises one or more batteries, a sensor board, and a power board. The power bus is used to electrically connect the set of battery packs, and wherein the sensor board: receives a voltage difference between a battery pack not connected to the power bus and the power bus; determines whether the voltage difference indicates that a battery pack voltage is too low compared to a power bus voltage; and in response to determining the voltage difference indicates that the battery pack voltage is too low compared to the power bus voltage, no immediate action is taken. The battery pack on the bus will continue to power the load and discharge until both packs are within a voltage threshold for connecting.

In some embodiments, a battery system comprises a power bus and a set of battery packs. A battery pack of the set of battery packs comprises one or more batteries, a sensor board, and a power board. The power bus is used to electrically connect the set of battery packs, and wherein the sensor board: receives a voltage difference between a battery pack not connected to the power bus and the power bus; determines whether the voltage difference indicates that a battery pack voltage is too low compared to a power bus voltage; and in response to determining the voltage difference indicates that the battery pack voltage is too low compared to the power bus voltage, provides an excess indication to transfer excess energy indicated by the voltage difference from the battery pack to the one or more battery packs so that a voltage of the one or more battery packs is increased.

Connecting battery packs in a parallel configuration presents the challenge of ensuring voltage imbalances among different packs are minimized prior to connection. Excess voltage imbalances can lead to large current conditions if the packs are connected to each other before such imbalances are corrected, in turn resulting in possible energy loss, equipment damage, meltdown, and/or fire. Besides the concomitant personnel safety issues associated with equipment meltdown and fire (e.g., high heat, toxic smoke, explosion hazard, etc.), loss of the battery system may result in loss of power to critical loads.

The reason that each battery pack's resting voltage has to be similar to the float voltage (e.g., the voltage of the distribution or power bus) prior to connecting the packs in parallel is to avoid so-called "circulating current" flowing among packs at different states of charge (SOC) or voltages. Connecting a new battery pack at very low SOC or voltage to other packs at very high SOC or voltage could be hazardous, especially when the existing battery packs are under float charging because the new pack receives the charge current not only from the existing pack but also from the battery charger (e.g., a solar charger or other type of charger). Hence, the new pack has to be charged by a separate charging process until its voltage reaches the existing float voltage.

In the case of battery systems deployed in the field (e.g., at remote locations), it is not possible without considerable effort and expense to precisely match pack voltages prior to connection given changes that occur to each pack's SOC during transport or storage (e.g., due to variable and often unpredictable transport times and temperatures, slight differences in each pack's chemistry, etc.). In the case of replacement packs that will be swapped out or added to an existing operational battery system, the float voltage of the operational system is also an unpredictable variable.

Existing solutions to this challenge include battery management systems with a battery charge/discharge regulator between the battery and the distribution bus (i.e., a "regulated system") or a connection through a switch/diode between the battery and the distribution bus (i.e., an "unregulated system").

The most common approach to a regulated system is to insert bidirectional DC/DC converters at the output stage of each battery to provide a stable output voltage on the distribution bus even if the battery packs are at different SOCs. Charging/discharging current of each battery pack can also be controlled by each DC/DC converter and there will no circulating current among different battery packs. However, this approach increases the number of power electronic parts and the cost as well as the complexity of the system.

In contrast, an unregulated system has no bidirectional DC/DC converter at the output stage of each battery pack to provide a stable output voltage on the distribution bus. Instead, only resistors or diodes are inserted between each pack and the distribution bus. For example, external resistors are inserted to compensate for the deviation of internal resistance of each battery pack to equalize the output voltage of each output stage. The benefit of this approach is that the circulating current among different battery packs can be reduced using the resistors. This approach is easy to apply but has the disadvantage of extra power consumption by the resistors when charging/discharging. Another solution is to replace the external resistors with diodes. The benefit of this approach is that there will be no circulating current among different battery packs due to the diodes' reverse blocking. But even with a low-voltage-drop Schottky diode, the diodes still cause extra power consumption when discharging. Further, the main disadvantage of this approach is that battery packs are only allowed to discharge.

The disclosed system is an improvement over other battery management systems in that it includes an automated, self-balancing system that can safely connect modular and interchangeable battery packs to each other and to the distribution bus (i.e., the power bus) in a chainable and extendable fashion and while simultaneously minimizing power consumption, the number of electronic parts, system cost, and complexity. Additionally, unlike an unregulated system, the system allows for both charging and discharging of parallel-connected battery packs while connected to the distribution bus, even when the bus is under load.

In some embodiments, the system is used to power a remote load (e.g., an active sensor-based monitoring system). The ability to quickly add new battery packs to the power bus, and/or to swap out existing packs in need of maintenance, minimizes downtime of the remote load. In some embodiments, the remote load plays a critical role in active security or defense monitoring systems that need to remain continually energized (e.g., a counter drone monitoring system).

In some embodiments, a monitoring system being setup in the field for the first time benefits from the ability to deploy, install, and connect all necessary components (e.g., the battery system, a set of solar panels, a sensor tower, etc.) without waiting for manual battery pack voltage equalization. Once installed and connected, the disclosed battery system takes over automated rapid balancing and connection of the battery packs to the power bus, thus energizing a critical load in minimal time. In some embodiments, the battery packs are manually charged to maximum SOC prior to transport so that upon arrival to the remote location, they typically are at a voltage above the nominal power bus voltage despite losses incurred during transport. In this example, the disclosed battery system only has to bleed off excess charge from each pack to allow the packs to be balanced prior to connection. This provides a more rapid connection and energizing of the load than if the battery packs needed to be charged in the field.

In some embodiments, a monitoring system is already setup and active in the field but requires additional power (e.g., due to upgrading the monitoring system with additional active components or replacing components with ones that have a greater power requirement). In this example, one or more new battery packs, due to their modular and extendable nature, can be quickly installed and connected to the power bus without disconnecting any of the other installed battery system components.

In some embodiments, a monitoring system is already setup and active in the field but requires replacement of one or more installed battery packs (e.g., due to a defective pack, a pack that has reached the end of its serviceable life, for preventative maintenance, etc.). In this example, the monitoring system is powered down, the modular packs are quickly swapped out, and the disclosed battery system takes over rapid balancing, connection, and reenergizing of the load.

In some embodiments, battery packs of any charge levels can be connected. When the battery system is turned on, a processor determines how to either balance and/or charge the various packs to bring them all to the same SOC prior to connection.

In some embodiments, the battery system comprises a communication bus. In some embodiments, the battery packs communicate with each other through the communication bus (e.g., a dedicated serial line).

In some embodiments, if charging is available (e.g., a dedicated charger or solar power), then the lowest-voltage pack closes and starts charging up. The other packs bleed off excess charge to meet it and connect to the bus as their voltages match. The load is energized when there is sufficient voltage on the bus (i.e., the nominal power bus voltage).

In some embodiments, if charging is not available, the highest-voltage pack is connected to the power bus, and the load is turned on. As the battery drains, it will meet the voltage of the other packs. Charging is disabled until all packs are connected.

In some embodiments, the set of battery packs includes a master battery pack and one or more slave battery packs. In some embodiments, the master battery pack includes a charging unit. In some embodiments, the charging unit receives power from one or more solar panels.

In some embodiments, a first enclosure of the master battery pack and a second enclosure of a slave battery pack of the one or more slave battery packs are substantially similar in size and shape. In some embodiments, there is one master pack/enclosure and one or more slave battery pack/enclosures (e.g., 3, 5, 7, or any appropriate number). In some embodiments, the one or more battery pack enclosures are ruggedized and sealed for use in remote field conditions under extremes of operating conditions (e.g., high and low temperature/humidity, rain, snow, wind, dust, sand, etc.).

In some embodiments, all packs have a contactor to connect themselves to the power bus, and a power draw mechanism (e.g., a bleed resistor) to self-discharge for balancing. In some embodiments, the master pack controls all pack balancing and contactor closures. In some embodiments, the sensor board of the master battery pack comprises a voltage sensor, a processor, and a voltage difference calculator used to determine the voltage difference between a disconnected battery pack and the power bus.

In various embodiments, the power draw mechanism comprises a bleed resistor, a small vibration motor, a series of LEDs, or any other device that consumes power.

In some embodiments, a state machine encoded into the firmware of the master pack sensor board processor monitors battery voltages and decides what packs should bleed/close their contactor and also handles pack charging.

In some embodiments, the master state machine comprises the following states:
(i) When the battery system is turned off, all packs have their contactors open and are in a low-power state.
(ii) When the battery system is turned on, the master picks a pack to close its contactor first. If there is external power available (e.g., solar power or other external power source) to charge the batteries, then it closes the lowest-voltage pack first.
(iii) The master enables charging and the lowest-voltage pack starts to rise. All other packs bleed down to match the pack. When the voltages are equal, each pack connects as instructed by the master.
(iv) If there is no external power available, the master closes the highest-voltage pack first. The pack bleeds power to lower its voltage or, if a load is connected and on, the load drains the pack.
(v) As the voltage falls, other packs will connect in once the voltages match. All packs can then be charged together once charging power is available.
(vi) If a battery pack reports an error that would make it unable to close its contactor, the master ignores that pack and will not require it to balance or try to connect to the rest of the packs. This error is reported back to a computer so the pack can be replaced or repaired.

In some embodiments, a dedicated serial line transmits instructions from the master pack to slave packs. In some embodiments, the dedicated serial line is used to transmit battery pack voltages and any pack errors (e.g., to the master pack). In some embodiments, when a slave pack is in need of bleeding off excess charge, instructions are sent to the slave pack sensor board processor indicating to close the power draw mechanism (e.g., a bleed resistor) contactor on the slave pack power board.

In some embodiments, in response to determining the voltage difference indicates that the voltage of the disconnected battery pack is within a threshold value of the voltage of the power bus, the sensor board processor of the master battery pack provides an indication to connect the disconnected battery pack to the power bus by indicating to close an electrical contactor. In some embodiments, the electrical contactor used to connect the disconnected battery pack to the power bus is located on the power board of the disconnected battery.

In some embodiments, in response to determining the voltage difference indicates that the voltage of the disconnected battery pack is too high, the sensor board processor of the master battery pack provides a drain indication to drain off the disconnected battery pack using a power draw mechanism (e.g., a bleed resistor) until the voltage of the battery pack is within a threshold voltage difference of the power bus. In some embodiments, the power draw mechanism (e.g., a bleed resistor) is located within the enclosure of disconnected battery pack.

In some embodiments, the power draw mechanism comprises a bleed resistor, wherein the bleed resistor bleeds excess energy in the form of heat. In some embodiments, the heat is used to reach a target operating temperature specific to the battery system, the battery pack, the battery pack module, or any other appropriate component.

In some embodiments, a computer is connected to the battery system. In some embodiments, the computer is a standalone computer, connected to the batteries through a Controller Area Network (CAN) bus. In some embodiments, the computer further comprises a memory and/or user interface that is coupled to the computer processor and configured to provide the processor with instructions. In some embodiments, the computer is also used as part of controlling and monitoring a larger system (e.g., an active monitoring system) being powered by the battery system.

In some embodiments, the computer is connected to the sensor boards in each battery pack via the CAN bus. In some embodiments, the sensor board of the one or more battery packs comprises a voltage sensor and a processor. In some embodiments, firmware is used to instruct a battery pack sensor board processor. In some embodiments, the firmware includes several asynchronous threads. In some embodiments, the asynchronous threads comprise reading sensor data (e.g., voltages, temperatures, etc.), responding to requests for data from the master pack over the dedicated serial line (slave pack only), receiving and responding to commands over the CAN (e.g., returning sensor data, reading contactor states, etc.), and/or communicating with the dedicated BMU to make sure there are no battery issues detected.

In some embodiments, the computer is used to monitor and record battery pack status. In some embodiments, each pack includes an independent battery management unit (BMU) that checks the battery pack for any problems. In some embodiments, the computer locally stores battery pack status and other diagnostic information and/or uploads such information to a cloud network for remote communication to the end user. In some embodiments, each battery pack sensor board has its own internal sensor data storage that occasionally saves a snapshot of all its data. In some embodiments, the internal sensor data storage holds several days of data in a log file.

FIG. 1A is a block diagram illustrating an embodiment of a battery system powering a load. In the example shown, battery system 2 is used to power load 12. Battery system 2 is able to add or swap out battery packs to the power bus easily and rapidly to minimizes downtime by including an automated self-balancing system. For example, load 12 comprises a perimeter monitoring system, a perimeter defense system, or any other appropriate system remote from readily available power. Battery system 2 is charged by external charger 4 or one or more of solar panel 6, solar panel 8, and solar panel 10. Computer 14 is used to monitor and record battery system status (e.g., individual pack SOC or voltage, battery health, number and/or timing of charge/discharge cycles, or any other appropriate system diagnostics). Computer 14 receives battery system data and other diagnostic information from battery system 2 via communication interface 20 for processing by processor 16. For example, battery system 2 may periodically transmit to computer 14 battery pack voltages, temperatures, depth of discharge, and any other appropriate information about the state or health of battery system 2 so as to track system performance over time; in another example, computer 14 may request such information from battery system 2. Processor 16 uses memory 18 to temporarily store (e.g., instructions and/or data) and aid in the processing of the received battery system data until it is moved to longer term storage in data storage unit 22. Processed data is made available to user display 28 via I/O interface 24. User input 26 is used to input, or request, additional battery system information from computer 14. Computer 14 locally stores (e.g., in data storage unit 22) and/or uploads such information to a cloud network (not shown) for communication to a remote end user.

Figure 1B:
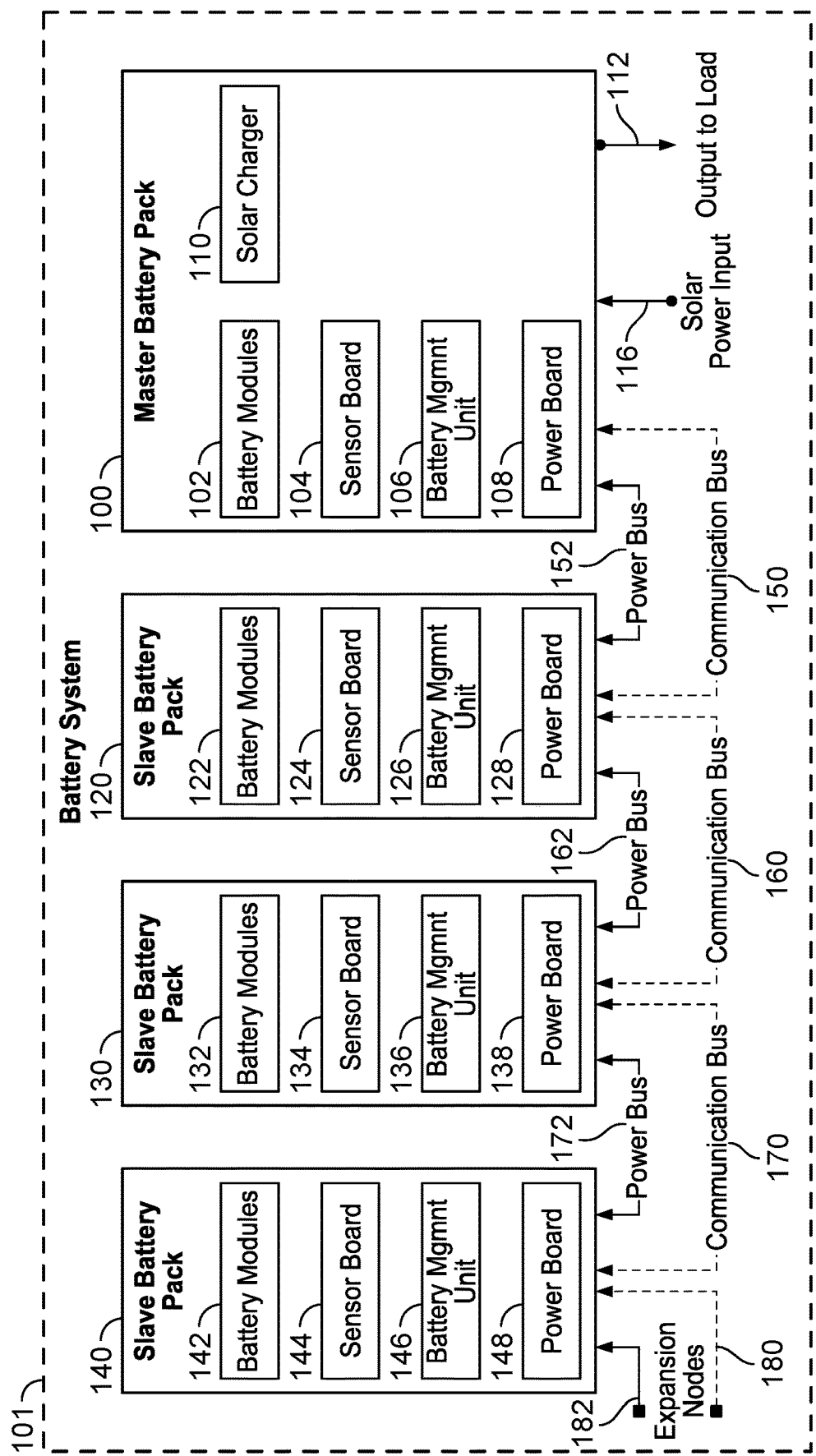
FIG. 1B is a block diagram illustrating an embodiment of a battery system.

FIG. 1B is a block diagram illustrating an embodiment of a battery system. In some embodiments, battery system 101 corresponds to battery system 2 in FIG. 1A. In some embodiments, the one or more battery packs are electrically connected in parallel. In some embodiments, the battery cells of the one or more battery packs are electrically connected in a series and parallel configuration. For example, a battery pack comprising N battery modules connected in parallel, with each module comprising M sets of series-connected cells wherein each set of series-connected cells comprises L cells connected in parallel (e.g., a N parallel module each with M sets of series-connected cells, which are each L parallel cells—for example, in some cases N=4, M=3, and L=6 for a four module 6p3s configuration).

In the example shown, battery system 101 comprises master battery pack 100, slave battery pack 120, slave battery pack 130, and slave battery pack 140. Additional slave battery packs can be added (i.e., extended) to battery system 101 via power bus expansion node 182 and communication bus expansion node 180. An external battery charger can be connected to power bus expansion node 182 (e.g., an external charger with its own charging regulation circuitry).

The power bus of battery system 101 comprises power bus 152, power bus 162, power bus 172, and other power bus wiring (not shown) internal to each battery pack. The power bus comprises electrical cabling chosen to support the amperage requirements and environmental operating conditions of battery system 101. Power bus 152, power bus 162, and power bus 172 connect power board 108, power board 128, power board 138, and power board 148.

The communication bus of battery system 101 comprises communication bus 150, communication bus 160, communication bus 170, and other communication bus wiring (not shown) within each battery pack. The communication bus of battery system 101 comprises electrical cabling chosen to support the communication requirements (e.g., a dedicated serial line, parallel lines, optical lines, etc.) and environmental operating conditions of battery system 101. Communication bus 150, communication bus 160, and communication bus 170 are used to connect sensor board 104, sensor board 124, sensor board 134, and sensor board 144.

Master battery pack 100 comprises battery modules 102, sensor board 104, battery management unit (BMU) 106, power board 108, solar charger 110, solar power input connection 116, and load output connection 112. Battery modules 102 comprise one or more individual battery modules (e.g., two or any other appropriate number of battery modules). Solar power input connection 116 provides connections to one or more solar panels (e.g., one, two, three, or any other appropriate number of solar panels to enable charging of battery modules).

Master battery pack 100 communicates with slave battery pack 120, slave battery pack 130, and slave battery pack 140 via the communication bus of battery system 101. Master battery pack 100 provides power to an external load via the power bus of battery system 101 and load output connector 112.

Slave battery pack 120 comprises battery modules 122, sensor board 124, BMU 126, and power board 128. Similarly, slave battery pack 130 comprises battery modules 132, sensor board 134, BMU 136, and power board 138; and slave battery pack 140 comprises battery modules 142, sensor board 144, BMU 146, and power board 148. Slave battery pack 120, slave battery pack 130, and slave battery pack 140 are substantially similar to each other. In various embodiments, the number of battery modules 122, battery modules 132, and battery modules 142 each comprise one, two, three, four, five, or any other appropriate number of individual battery modules.

In some embodiments, the individual battery modules of battery modules 102, battery modules 122, battery modules 132, and battery modules 142 are substantially similar in size and shape to each other. In some embodiments, the number of battery modules 102 is chosen to allow physical space for solar charger 110 when using a battery pack enclosure substantially similar in size and shape to the enclosures used for slave battery pack 120, slave battery pack 130, and slave battery pack 140. For example, if four individual battery modules substantially similar in size and shape to each other fit into a slave battery pack enclosure, and solar charger 110 takes up the space of two individual battery modules, then up to two individual battery modules would fit into a similar size and shape enclosure comprising master battery pack 100.

Figure 2:
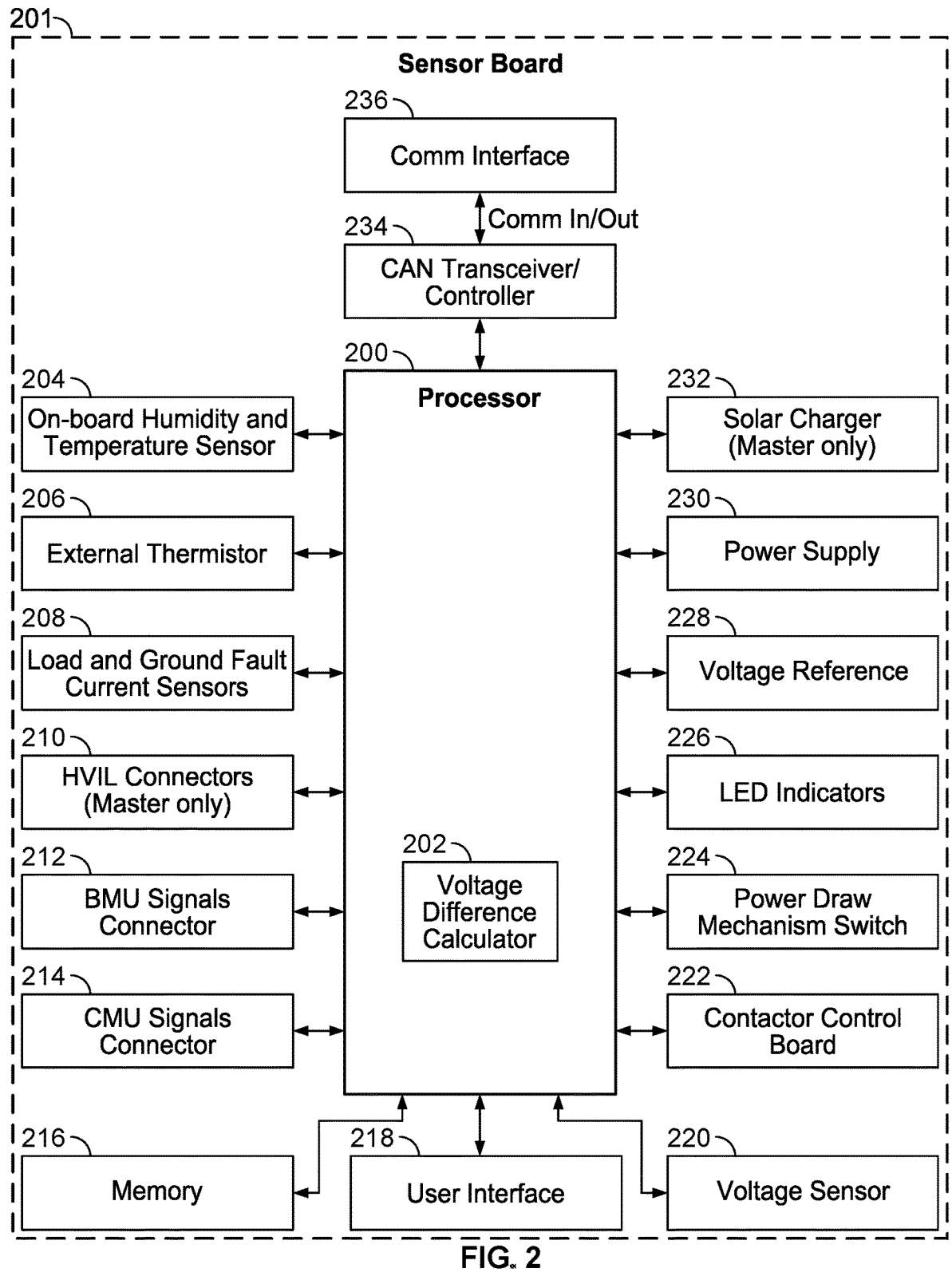
FIG. 2 is a block diagram illustrating an embodiment of a sensor board.

FIG. 2 is a block diagram illustrating an embodiment of a sensor board. In various embodiments, sensor board 201 comprises sensor board 104, sensor board 124, sensor board 134, or sensor board 144 of FIG. 1B. In the example shown, sensor board 201 comprises sensor board processor 200, voltage difference calculator 202, on-board humidity and temperature sensor 204, external thermistor 206, load and ground fault current sensors 208, high voltage interlock loop (HVIL) connectors 210, battery management unit (BMU) signals connector 212, communication management unit (CMU) signals connector 214, memory 216, user interface 218, voltage sensor 220, contactor control board 222, power draw mechanism switch 224, LED indicators 226, voltage reference 228, power supply 230, solar charger hardware 232, CAN transceiver/controller 234, and communication interface 236.

Sensor board processor 200 controls one or more switches (e.g., contactors on a power board) via contactor control board 222 used to connect: (i) one or more battery modules to the power bus or to a power draw mechanism; (ii) a solar charger, or an external charger to the power bus; or (iii) the power bus to an external load.

Voltage difference calculator 202 is used to determine the voltage difference between a battery pack and the power bus. In some embodiments, voltage difference calculator 202 is implemented on a master battery pack sensor board to calculate a voltage difference between battery and bus voltage values received from one or more slave battery packs and a power bus.

Sensor board processor 200 is powered via power supply 230 in coordination with voltage reference 228 and used to receive into memory 216 a voltage difference between a battery pack not connected to the power bus (i.e., the disconnected battery pack) and the power bus; determine whether the voltage difference indicates that a battery pack voltage is too high compared to the power bus voltage as calculated using voltage difference calculator 202; in response to determining the voltage difference indicates that the disconnected battery pack voltage is too high compared to the power bus voltage, provide a drain indication to drain off the battery pack by sending an instruction via communication interface 236 to close a bleed resistor switch in the disconnected battery pack—or in the event that the disconnected battery pack comprises sensor board 201, by sending a connect indication to power draw mechanism switch 224—until the voltage of the disconnected battery pack is within a threshold voltage difference of the power bus; and provide a connect indication via communication interface 236 to connect the disconnected battery pack to the power bus—or in the event that the disconnected battery pack contains sensor board 201, by sending a connect indication via contactor control board 222.

Firmware is used to instruct sensor board processor 200. In various embodiments, a state machine encoded into the firmware of sensor board processor 200 monitors one or more battery pack voltages and decides what packs should have power drawn from them (e.g., bleed/close their bleed resistor contactor) and also handles pack charging.

In some embodiments, the firmware includes several asynchronous threads. In the example shown, asynchronous threads comprise reading sensor data from on-board humidity and temperature sensor 204 to measure humidity and temperature internal to the battery system; external thermistor 206 to measure temperature external to the battery system; load and ground fault current sensors 208 to measure current being supplied to an external load and to identify ground faults (e.g., due to insulation breakdown); and voltage sensor 220 to measure voltage of the power bus.

In some embodiments, the asynchronous threads comprise responding to requests for data from a master pack over a dedicated serial line—for example, via communication management unit (CMU) signals connector 214.

In various embodiments, the asynchronous threads comprise receiving and responding to commands over a Controlled Area Network (CAN) (e.g., returning sensor data, reading contactor states, etc.), and/or communicating with a dedicated battery management unit (BMU) via BMU signals connector 212 to make sure there are no battery issues detected.

Sensor board processor 200 is used to communicate to other battery packs through a communication bus (e.g., a dedicated serial line) via CAN transceiver/controller 234 and communication interface 236. In some embodiments, a computer is connected to sensor board processor 200 via the CAN bus. In some embodiments, user instructions can be communicated to sensor board processor 200 via user interface 218.

In some embodiments, solar charger 232 is used in a master battery pack (e.g., master battery pack 100 of FIG. 1B). In various embodiments, solar charger 232 is used to read a solar voltage or to operate a solar/load contactor. In some embodiments, load and ground fault current sensors 208 are used as a battery current sensor (e.g., in slave battery packs). In some embodiments, load and ground fault current sensors 208 are used to monitor current supplied to an external load. In some embodiments, high voltage interlock loop (HVIL) connectors 210 are used as a safety mechanism to provide warning signals to a system operator in the event any high voltage access points are open. In some embodiments, warning signals comprise illuminating one or more LED indicators 226. In some embodiments, LED indicators 226 are installed on the battery pack enclosure containing sensor board 201 (e.g., on an exterior panel). In various embodiments, LED indicators 226 are used to indicate the status of one or more of the following battery pack conditions: battery modules connected to the power bus; battery modules connected to the power draw mechanism; or the power bus connected to an external load.

Figure 3A:
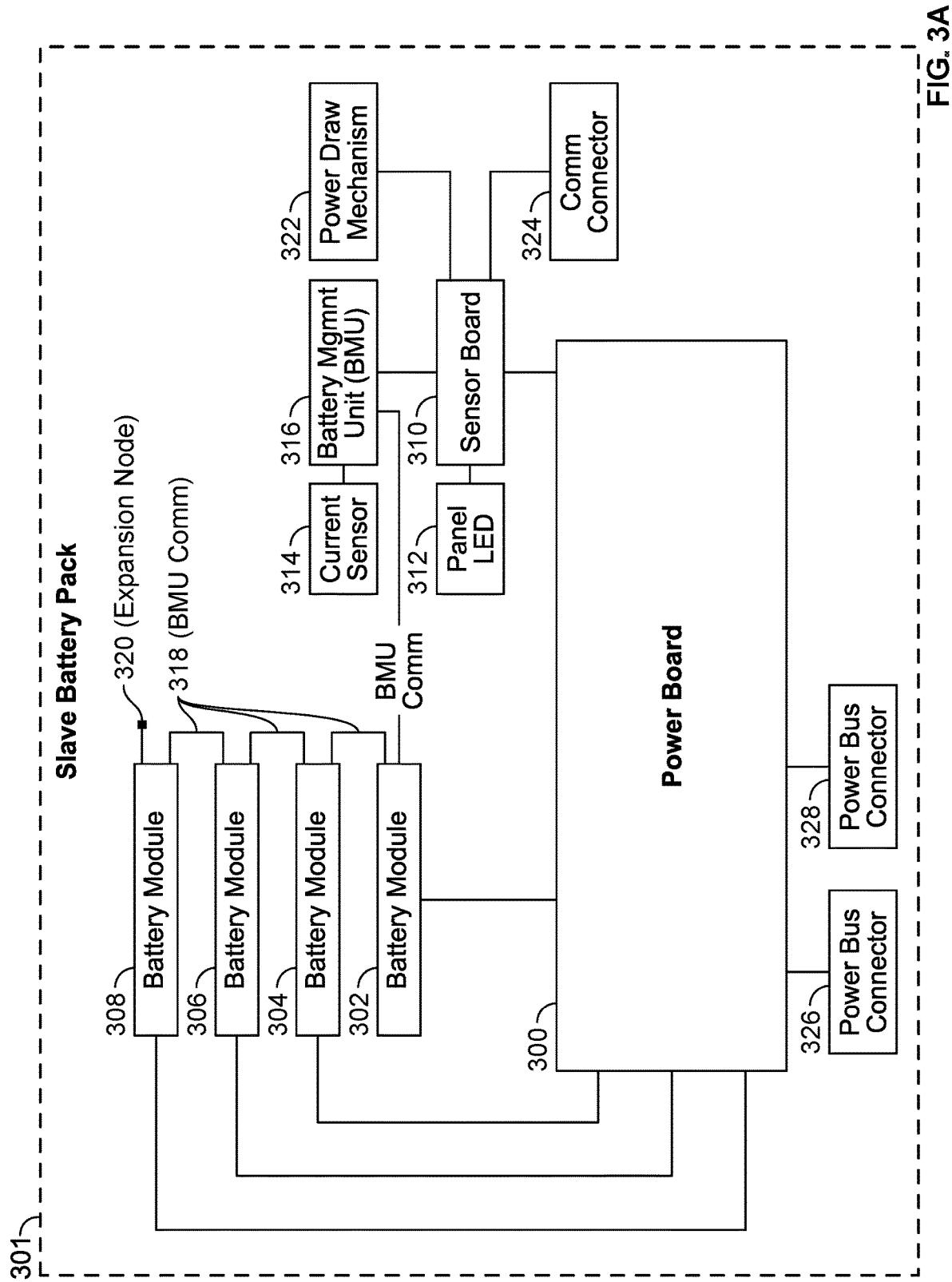
FIG. 3A is a block diagram illustrating an embodiment of a power board in relation to the main components comprising a slave battery pack.

FIG. 3A is a block diagram illustrating an embodiment of a power board in relation to the main components comprising a slave battery pack. In various embodiments, slave battery pack 301 comprises the power board and related components of slave battery pack 120, slave battery pack 130, or slave battery pack 140 of FIG. 1B. In the example shown, power board 300 comprises one or more electrical contactors, wherein an electrical contactor of the one or more electrical contactors receives an indication from sensor board 310 to open or close. The electrical contactor of the one or more electrical contactors on power board 300 is/are used to connect or disconnect battery module 302, battery module 304, battery module 306, and/or battery module 308 to or from the power bus via power bus connector 326 and power bus connector 328. Battery module 302, battery module 304, battery module 306, and battery module 308 are connected to power board 300 via electrical cable.

Sensor board 310 receives a drain indication from a master battery pack (not shown) via communication bus connector 324 to drain off battery module 302, battery module 304, battery module 306, and/or battery module 308 using power draw mechanism 322 until the voltage of battery module 302, battery module 304, battery module 306, and/or battery module 308 are within a threshold voltage difference of the power bus. Power draw mechanism 322 is used to bleed excess energy in the form of heat (i.e., resistive heating). In some embodiments, an other power draw mechanism (not shown) routes excess energy from battery module 302, battery module 304, battery module 306, and/or battery module 308 to one or more other battery packs (not shown) to increase one or more other battery pack's SOC.

Battery module 302, battery module 304, battery module 306, and battery module 308 are modular (i.e., each module can be replaced without affecting the rest of the system). Battery module 302, battery module 304, battery module 306, and battery module 308 each comprise one or more battery cells. Battery management unit (BMU) 316 is used to determine a voltage of the one or more battery cells. BMU 316 balances voltages across the battery cells of battery module 302, battery module 304, battery module 306, and battery module 308. In some embodiments, BMU 316 relies on current sensor 314 to limit current between cells to safe levels while balancing cell voltages (e.g., to prevent overheating or equipment damage, etc.). In some embodiments, current sensor 314 comprises a current sense amplifier and a microcontroller unit (e.g., with an integrated analogue-digital converter). In some embodiments, current sensor 314 comprises a 'battery fuel gauge', also known as a 'battery gas gauge', to determine battery SOC and state of health. A battery fuel gauge integrated circuit can also predict how much longer, under specific operating conditions, the battery can continue to provide power.

BMU 316 communicates with the battery cells in battery module 302, battery module 304, battery module 306, and battery module 308 via BMU communication bus 318. In some embodiments, additional battery modules can be added to BMU 316 via expansion node 320. In some embodiments, panel LED 312 is used to inform a system operator whether battery module 302, battery module 304, battery module 306, and/or battery module 308 are connected or disconnected from the power bus.

Figure 3B:
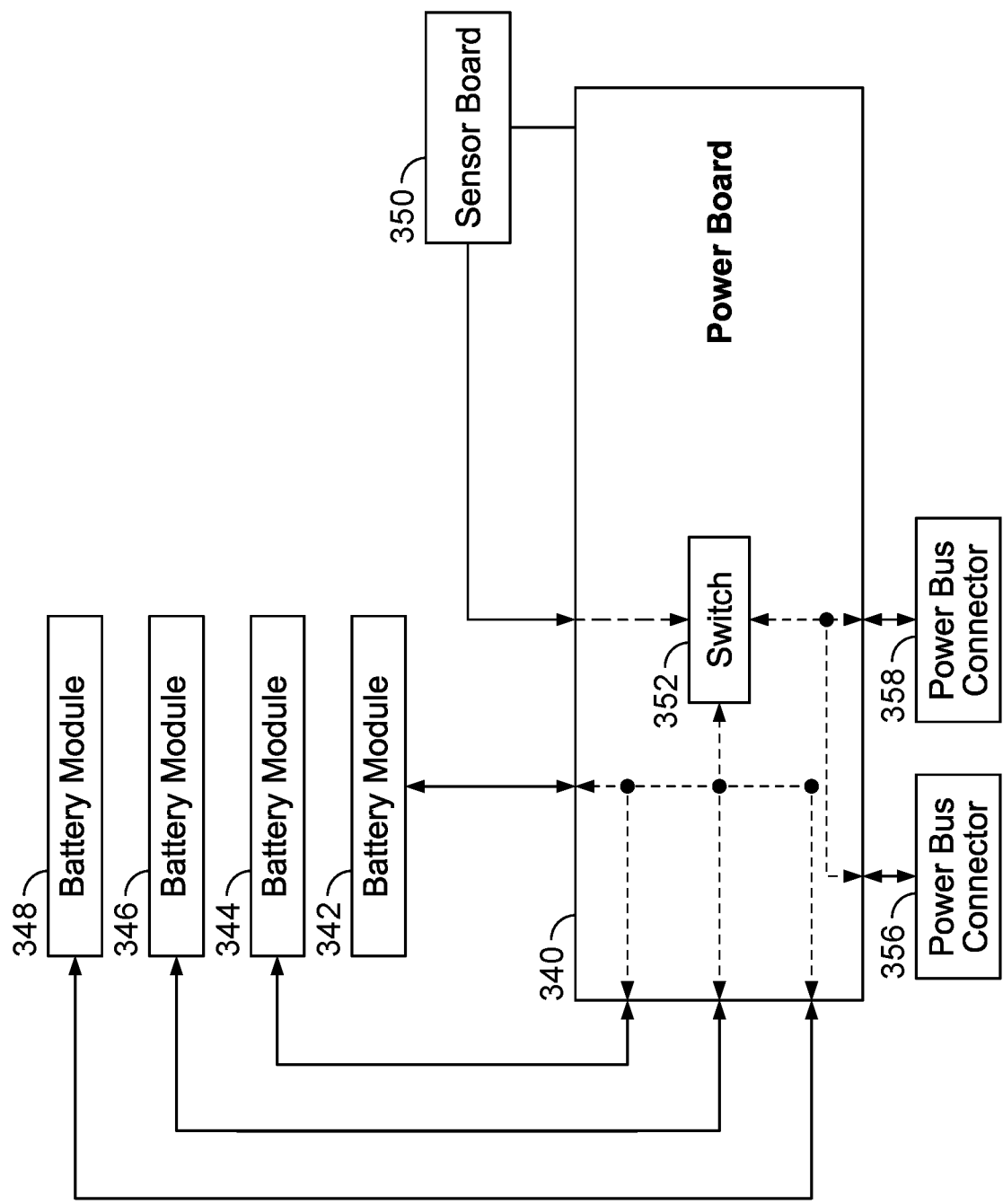
FIG. 3B is a block diagram illustrating an embodiment of a sensor-board controlled switch used to connect one or more battery modules to a power bus.

FIG. 3B is a block diagram illustrating an embodiment of a sensor-board controlled switch used to connect one or more battery modules to a power bus. In some embodiments, the sensor-board controlled switch comprises slave battery pack 301 of FIG. 3A. In some embodiments, the sensor-board controlled switch comprises a master battery pack. In the example shown, battery module 342, battery module 344, battery module 346, and battery module 348 are connected in parallel (i.e., the parallel-connected battery modules) by electrical cabling to power board 340. The parallel-connected battery modules route power through switch 352 to supply power to the power bus via power bus connector 356 and power bus connector 358. Power bus connector 356 and power bus connector 358 are used to connect the parallel-connected battery modules to one or more other battery packs (e.g., an other slave battery pack or a master battery pack). Sensor board 350 controls and monitors the position of switch 352 (e.g., an electrical contactor) to connect or disconnect the parallel-connected battery modules to or from the power bus.

In some embodiments, a master battery pack (not shown) sends an indication to the sensor board 350 to open or close switch 352. In various embodiments, sensor board 350 reports the position of switch 352 (e.g., an open or closed position) to a master battery pack upon changing and confirming the switch position, at periodic time intervals, or at any other appropriate time when queried by a master battery pack. In various embodiments, sensor board 350 reports the position of switch 352 to a computer (e.g., computer 14 of FIG. 1A) or to a panel LED on the outside of the battery pack enclosure. In some embodiments, the position of switch 350 is inferred from the presence or absence of a control signal applied to switch 352 by sensor board 350.

In some embodiments, power board 340 includes more switches to switch battery modules (e.g., battery module 342, battery module 344, battery module 346, battery module 348, etc.) in groups or individually to power bus connector 356 and/or power bus connector 358.

FIG. 3C is a block diagram illustrating an embodiment of a sensor-board controlled switch used to connect one or more battery modules to a bleed resistor. In some embodiments, the sensor-board controlled switch comprises slave battery pack 301 of FIG. 3A. In some embodiments, the sensor-board controlled switch comprises a master battery pack. In the example shown, battery module 372, battery module 374, battery module 376, and battery module 378 are connected in parallel (i.e., the parallel-connected battery modules) by electrical cabling to power board 370. The parallel-connected battery modules allow current to flow through switch 384 and sensor board 380 to power draw mechanism 382 so as to bleed off excess charge (e.g., in the form of resistive heating). Sensor board 380 controls and monitors the position of switch 384 (e.g., an electrical contactor) to connect or disconnect the parallel-connected battery modules to or from the power draw mechanism 382.

In some embodiments, a master battery pack (not shown) sends an indication to the sensor board 380 to open or close switch 384. In various embodiments, sensor board 380 reports the position of switch 384 (e.g., an open or closed position) to a master battery pack upon changing and confirming the switch position, at periodic time intervals, or at any other appropriate time when queried by a master battery pack. In various embodiments, sensor board 380 reports the position of switch 384 to a computer (e.g., computer 14 of FIG. 1A) or to a panel LED on the outside of the battery pack enclosure. In some embodiments, the position of switch 384 is inferred from the presence or absence of a control signal applied to switch 384 by sensor board 380.

In some embodiments, power board 370 includes more switches to switch battery modules (e.g., battery module 372, battery module 374, battery module 376, battery module 378, etc.) in groups or individually to power draw mechanism 382.

Figure 4A:
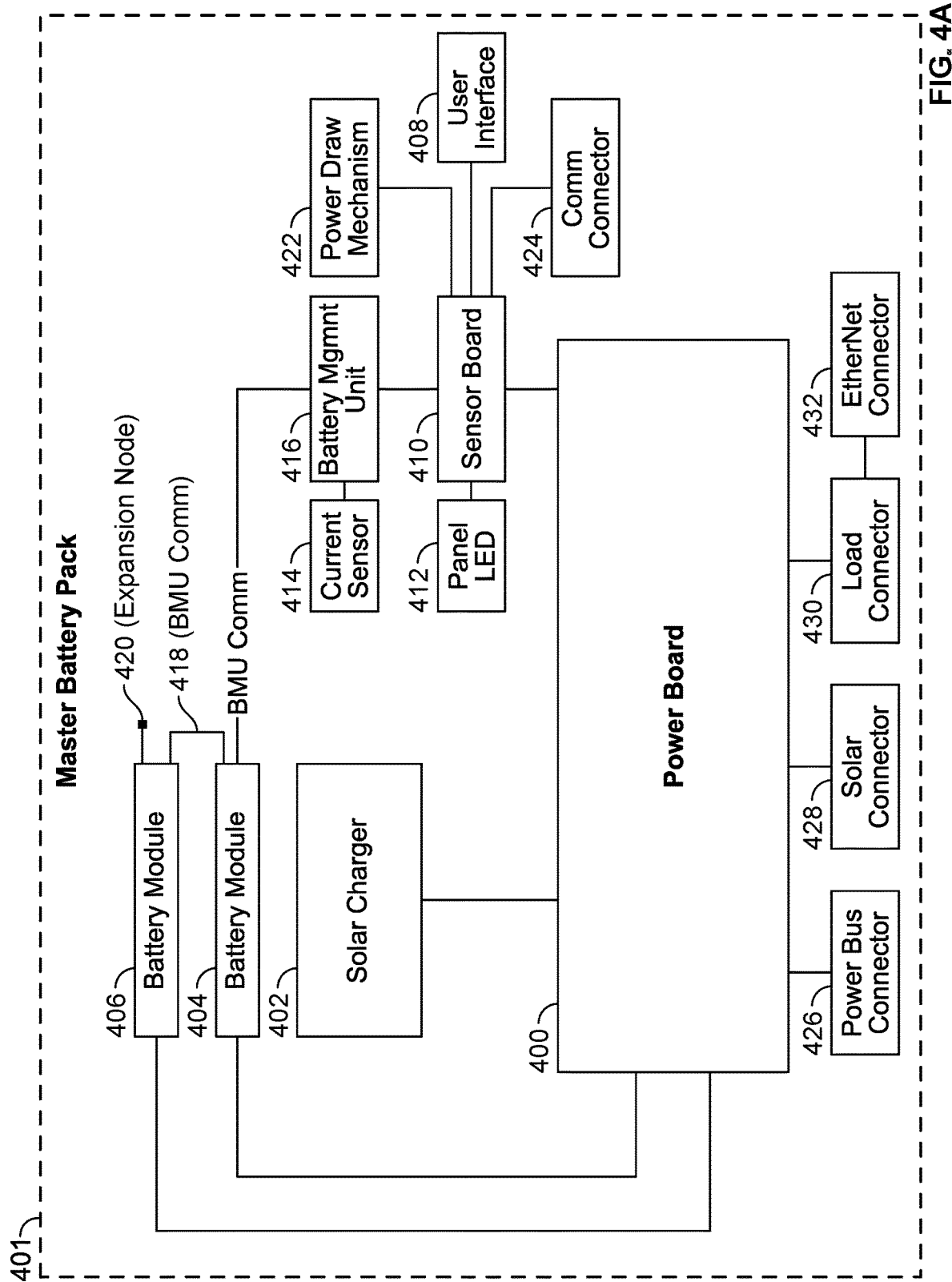
FIG. 4A is a block diagram illustrating an embodiment of a power board in relation to the main components comprising a master battery pack.

FIG. 4A is a block diagram illustrating an embodiment of a power board in relation to the main components comprising a master battery pack. In some embodiments, master battery pack 401 comprises the power board and related components of master battery pack 100 of FIG. 1B. In the example shown, battery module 404 and battery module 406 are connected in parallel to power board 400 via electrical cable. Power board 400 comprises one or more electrical contactors, wherein an electrical contactor of the one or more electrical contactors receives an indication from sensor board 410 to open or close. An electrical contactor of the one or more electrical contactors on power board 400 is used to connect or disconnect battery module 404 and battery module 406 to or from the power bus via power bus connector 426 (e.g., as determined and controlled by a firmware program operating on sensor board 410).

An other electrical contactor of the one or more electrical contactors on power board 400 is used to connect solar charger 402 to solar connector 428. Solar charger 402 is used to charge battery module 404 and battery module 406 and/or other battery packs connected to the power bus as determined by a firmware program operating on sensor board 410. Solar power input connection 428 provides connections to one or more solar panels (e.g., one, two, three, or any other appropriate number of solar panels to enable charging of battery modules).

Sensor board 410 receives voltage data from one or more voltage sensors—for example, from a voltage sensor on sensor board 410 or from other sensor boards on other battery packs (e.g., from a slave battery pack via communication bus connector 424)—and voltage data from the power bus (e.g., via a voltage sensor on sensor board 410). Sensor board 410 determines whether a voltage difference indicates that a battery pack voltage is too high compared to the power bus voltage and in response to determining the voltage difference indicates that the battery pack voltage is too high compared to the power bus voltage, provides a drain indication to drain off the battery pack using a power draw mechanism (e.g., bleed resistor, motor, LEDs, etc.) until the voltage of the battery pack is within a threshold voltage difference of the power bus.

In the example shown, if the voltage of parallel-connected battery module 404 and battery module 406 is too high compared to the power bus voltage, sensor board 410 provides a drain indication to a switch on power board 400 to drain off battery module 404 and battery module 406 using power draw mechanism 422. If the voltage of other battery packs is too high compared to the power bus voltage, sensor board 410 provides a drain indication via communication bus connector 424 to the one or more other battery packs to drain off their battery modules using their on-board power draw mechanisms.

Power draw mechanism 422 is used to bleed excess energy in the form of heat. In some embodiments, an other power draw mechanism (not shown) routes excess energy from battery module 404 and battery module 406 to one or more other battery packs to increase one or more other battery pack's SOC.

When battery module 404 and battery module 406 are within a threshold voltage difference of the power bus, sensor board 410 provides a connect indication to one or more electrical contactors on power board 400 to connect battery module 404 and battery module 406 to the power bus.

When sensor board 410 determines one or more battery packs are sufficiently charged to supply an external load and are connected to the power bus, sensor board 410 provides a connect indication to one or more electrical contactors on power board 400 to connect the power bus to the external load via load connector 430. Ethernet connector 432 provides a communication path (e.g., via an ethernet cable or via a wireless ethernet adapter) for a computer program and/or system operator to determine whether to remotely connect or disconnect the power bus to or from the external load (e.g., in the event of system malfunction, fire, or for any other appropriate safety or maintenance purpose). User interface 408 provides a local means for a system operator to control the state of the battery system (e.g., connecting or disconnecting the external load from the power bus). In some embodiments, user interface 408 comprises a keyswitch to provide for control the state of the battery system.

Battery module 404 and battery module 406 are modular. Battery module 404 and battery module 406 each comprise one or more battery cells. Battery management unit (BMU) 416 is used to determine a voltage of the one or more battery cells. BMU 416 balances voltages across the battery cells of battery module 404 and battery module 406. In some embodiments, BMU 416 relies on current sensor 414 to limit current between cells to safe levels while balancing cell voltages. In some embodiments, current sensor 414 comprises a current sense amplifier and a microcontroller unit. In some embodiments, current sensor 414 comprises a battery fuel gauge to determine battery SOC and state of health.

BMU 416 communicates with the battery cells in battery module 404 and battery module 406 via BMU communication bus 418. In some embodiments, additional battery modules can be added to BMU 416 via expansion node 420. In some embodiments, panel LED 412 is used to inform a system operator whether battery module 404 and battery module 406 are connected or disconnected from the power bus.

Figure 4B:
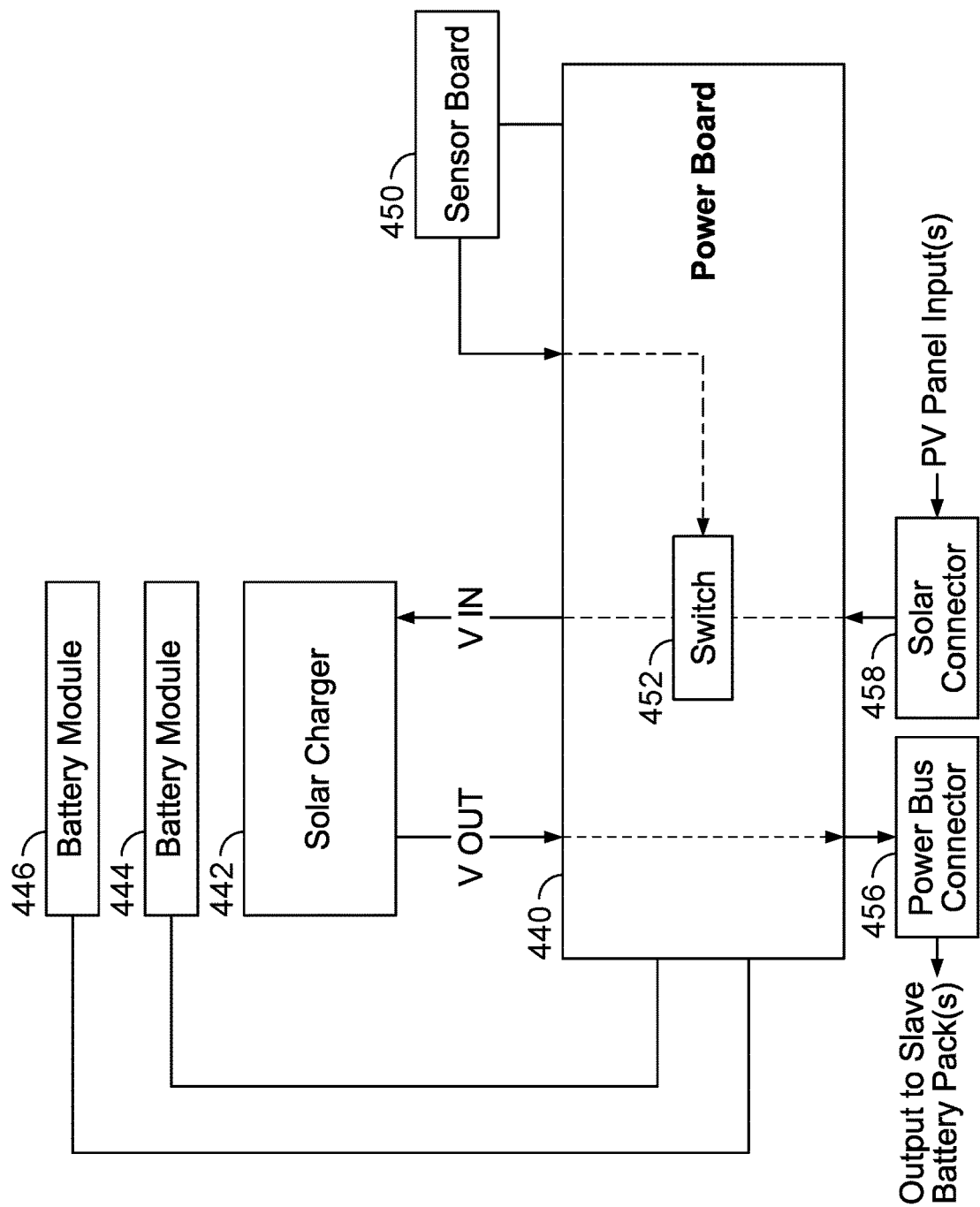
FIG. 4B is a block diagram illustrating an embodiment of a sensor-board controlled switch used to connect a set of photovoltaic panels to a power bus via a solar charger.

FIG. 4B is a block diagram illustrating an embodiment of a sensor-board controlled switch used to connect a set of photovoltaic panels to a power bus via a solar charger. In some embodiments, the sensor-board controlled switch and solar charger comprise master battery pack 401 of FIG. 4A. In some embodiments, a set of photovoltaic panels comprise solar panel 6, solar panel 8, and solar panel 10 of FIG. 1A. In the example shown, battery module 444 and battery module 446 are connected in parallel to power board 440 via electrical cable. A set of photovoltaic panels (not shown) are connected to power board 440 via solar connector 458. Solar charger 442 is connected to power board 440 and electrically floats on the power bus via power bus connector 456 when switch 452 is open.

Power board 440 comprises one or more electrical contactors, wherein an electrical contactor of the one or more electrical contactors receives an indication from sensor board 450 to open or close. An electrical contactor of the one or more electrical contactors on power board 440 is used to connect or disconnect solar charger 442 to or from the set of photovoltaic panels (e.g., as determined and controlled by a firmware program operating on sensor board 450). Sensor board 450 controls and monitors the position of switch 452 (e.g., by opening or closing an electrical contactor).

In various embodiments, sensor board 450 reports the position of switch 452 to a computer (e.g., computer 14 of FIG. 1A) or to a panel LED on the outside of the battery pack enclosure. In some embodiments, the position of switch 450 is inferred from the presence or absence of a control signal applied to switch 452 by sensor board 450.

Figure 4C:
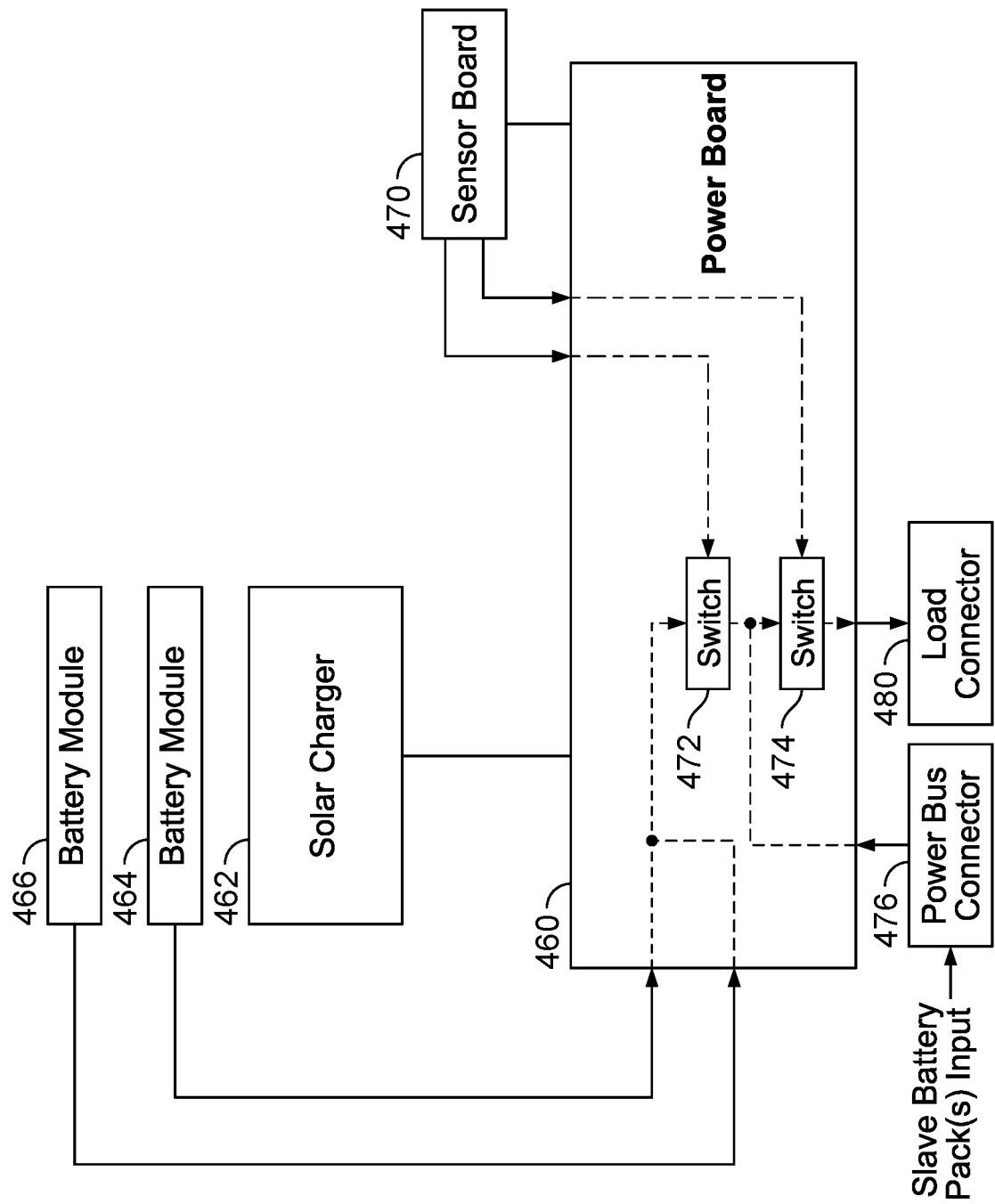
FIG. 4C is a block diagram illustrating an embodiment of a set of sensor-board controlled switches used to connect one or more battery modules to a power bus and/or to an external load.

FIG. 4C is a block diagram illustrating an embodiment of a set of sensor-board controlled switches used to connect one or more battery modules to a power bus and/or to an external load. In some embodiments, the sensor-board controlled switch comprises master battery pack 401 of FIG. 4A. In some embodiments, the external load comprises load 12 of FIG. 1A. In the example shown, battery module 464 and battery module 466 are connected in parallel to power board 460 via electrical cable. The external load (not shown) is connected to power board 460 via load connector 480. Solar charger 462 is used to charge battery module 464 and battery module 466 and/or other battery packs connected to the power bus as determined by a firmware program operating on sensor board 470.

Power board 460 comprises one or more electrical contactors, wherein an electrical contactor of the one or more electrical contactors receives an indication from sensor board 470 to open or close. An electrical contactor of the one or more electrical contactors on power board 460 is used to connect or disconnect battery module 464 and battery module 466 to or from the power bus via power bus connector 476 (e.g., as determined and controlled by a firmware program operating on sensor board 470). Sensor board 470 controls and monitors the positions of switch 472 and switch 474 (e.g., by opening or closing an electrical contactor).

In various embodiments, sensor board 470 reports the positions of switch 472 and/or switch 474 to a computer (e.g., computer 14 of FIG. 1A) or to a panel LED on the outside of the battery pack enclosure. In various embodiments, the position of switch 472 or switch 474 is inferred from the presence or absence of a control signal applied to switch 472 or switch 474 by sensor board 470. In some embodiments, a voltage sensor (e.g., a voltage sensor on sensor board 470) determines whether switch 474 is open or closed by measuring the voltage between switch 474 and load connector 480.

Figure 5:
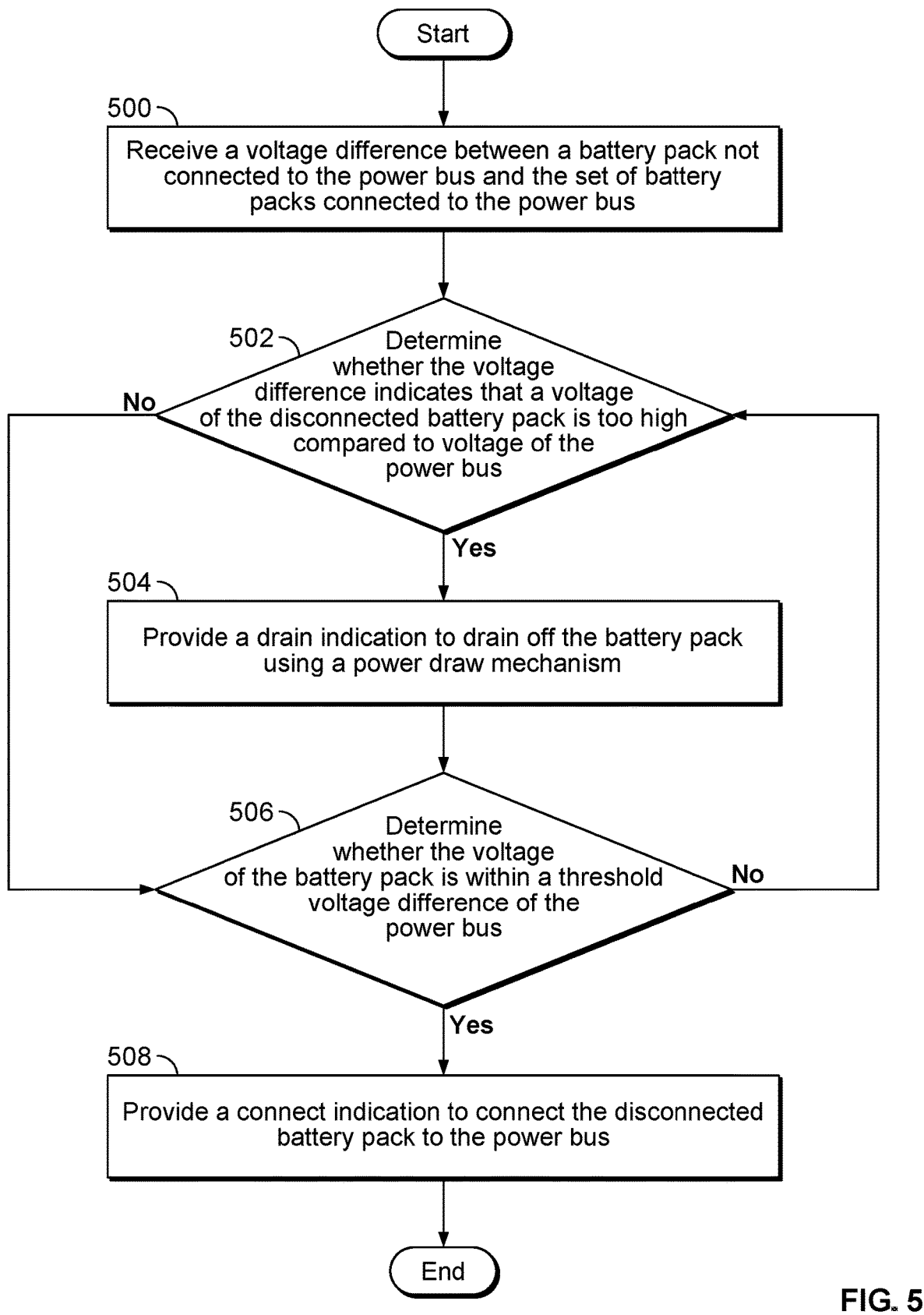
FIG. 5 is a flow diagram illustrating an embodiment of a method for balancing a battery system.

FIG. 5 is a flow diagram illustrating an embodiment of a method for balancing a battery system. In some embodiments, the process of FIG. 5 is executed using the processor of sensor board 201 of FIG. 2. In various embodiments, the process of FIG. 5 is executed in whole or in part using the sensor board processor of one or more slave battery packs. In various embodiments, the process of FIG. 5 is executed in whole or in part using the sensor board processor of a master battery pack. In various embodiments, the process of FIG. 5 is executed using any appropriate combination of one or more sensor board processors.

In the example shown, the process of FIG. 5 is used for receiving, at a sensor board, a voltage difference between a battery pack not connected to the power bus and the power bus, wherein the battery pack of the set of battery packs comprises one or more batteries, a sensor board, and a power board, and wherein the power bus is used to electrically connect the set of battery packs; determining, using the sensor board, whether the voltage difference indicates that a battery pack voltage is too high compared to a power bus voltage; in response to determining the voltage difference indicates that the voltage of the battery pack is too high compared to the power bus voltage, providing a drain indication to drain off the battery pack using a bleed resistor until the voltage of the battery pack is within a threshold voltage difference of the power bus; and providing a connect indication to connect the disconnected battery pack to the power bus.

In the example shown, in 500, a voltage difference between a battery pack not connected to the power bus and the set of battery packs connected to the power bus is received. For example, a voltage difference between a slave battery pack not connected to the power bus and the power bus connected to one or more other battery packs is received. In some embodiments, the voltage difference is calculated by the slave battery pack and communicated to a master battery pack. In some embodiments, voltage data from the slave battery pack is communicated to a master battery pack and used by the master battery pack sensor board to determine the voltage difference between the slave battery pack and the power bus. In another example, the voltage difference of a master battery pack from the power bus voltage (i.e., the voltage corresponding to one or more other battery packs connected to the power bus) is determined by the master battery pack (e.g., for use in determining whether the master battery pack is ready to connect to the power bus).

In 502, it is determined whether the voltage difference indicates that a voltage of the disconnected battery pack is too high compared to voltage of the power bus. For example, voltage measurements of the disconnected battery pack and the power bus are made by an on-board voltage sensor of the disconnected battery pack and the data communicated to the disconnected battery pack's sensor board for calculating the voltage difference. In some embodiments, the voltage data is communicated to a master battery pack sensor board for calculating the voltage difference.

In some embodiments, a disconnected battery pack will drain in the event that it's voltage is too high. In some embodiments, a disconnected battery pack will wait indefinitely for the power bus voltage to naturally balance to the disconnected battery pack (e.g., due to the load discharging the battery packs that are connected on the bus).

In response to determining the voltage difference indicates that a voltage of the disconnected battery pack is too high compared to voltage of the power bus, control passes to 504. For example, the disconnected battery pack has been previously charged to maximum SOC prior to transport so that upon arrival at the installation location, and prior to installation into the battery system (e.g., mounted in a rack, a cabinet, a box, or any other appropriate type of battery system enclosure or support; and connected to the other battery packs via cabling), it is at a voltage above the nominal power bus voltage despite losses incurred during transport. In some embodiments, the too high voltage value is communicated through a communication bus to a local or remote system operator.

In 504, a drain indication is provided to drain off the battery pack using a power draw mechanism. For example, a drain indication is sent from a master battery pack (e.g., a master battery pack that has determined a too-high voltage condition) to the battery pack sensor board to close a switch or contactor on the battery pack power board to connect the too-high voltage battery modules to a power draw mechanism built into the too-high voltage battery pack enclosure. In various embodiments, an other power draw mechanism, or any other appropriate intelligent circuitry to limit or control current flow when charging, routes excess energy from the too-high voltage battery modules to one or more other battery packs to increase one or more other battery pack's SOC.

In response to determining the voltage difference indicates that a voltage of the disconnected battery pack is not too high compared to voltage of the power bus in 502, control passes to 506. In 506, it is determined whether the voltage of the battery pack is within a threshold voltage difference of the power bus. For example, it is determined whether the voltage of the battery pack is within 100 mV or any other appropriate threshold voltage difference of the power bus. The threshold voltage difference is determined based on various battery system design parameters such as load power requirements, internal battery resistance (e.g., —6 milliohms), peak current conditions (e.g., switch-on inrush current or switch-off voltage spikes), maximum allowable current for the electrical cabling and other electrical components comprising the battery system (e.g., 120 amps or any other appropriate maximum allowable current), etc. In various embodiments, the threshold voltage difference is stored in system memory (e.g., in a memory of a sensor board processor) or programmed into the firmware used to control the battery system.

In response to determining the voltage of the battery pack is not within a threshold voltage difference of the power bus, control passes back to 502. In response to determining the voltage of the battery pack is within a threshold voltage difference of the power bus, control passes to 508. In 508, a connect indication is provided to connect the disconnected battery pack to the power bus, and the process ends. For example, a connect indication is communicated to the local sensor board, to a master battery pack sensor board, an external computer, and/or to a system user by any appropriate means (e.g., ethernet connection, wireless network, cloud-based network, etc.).

Figure 6:
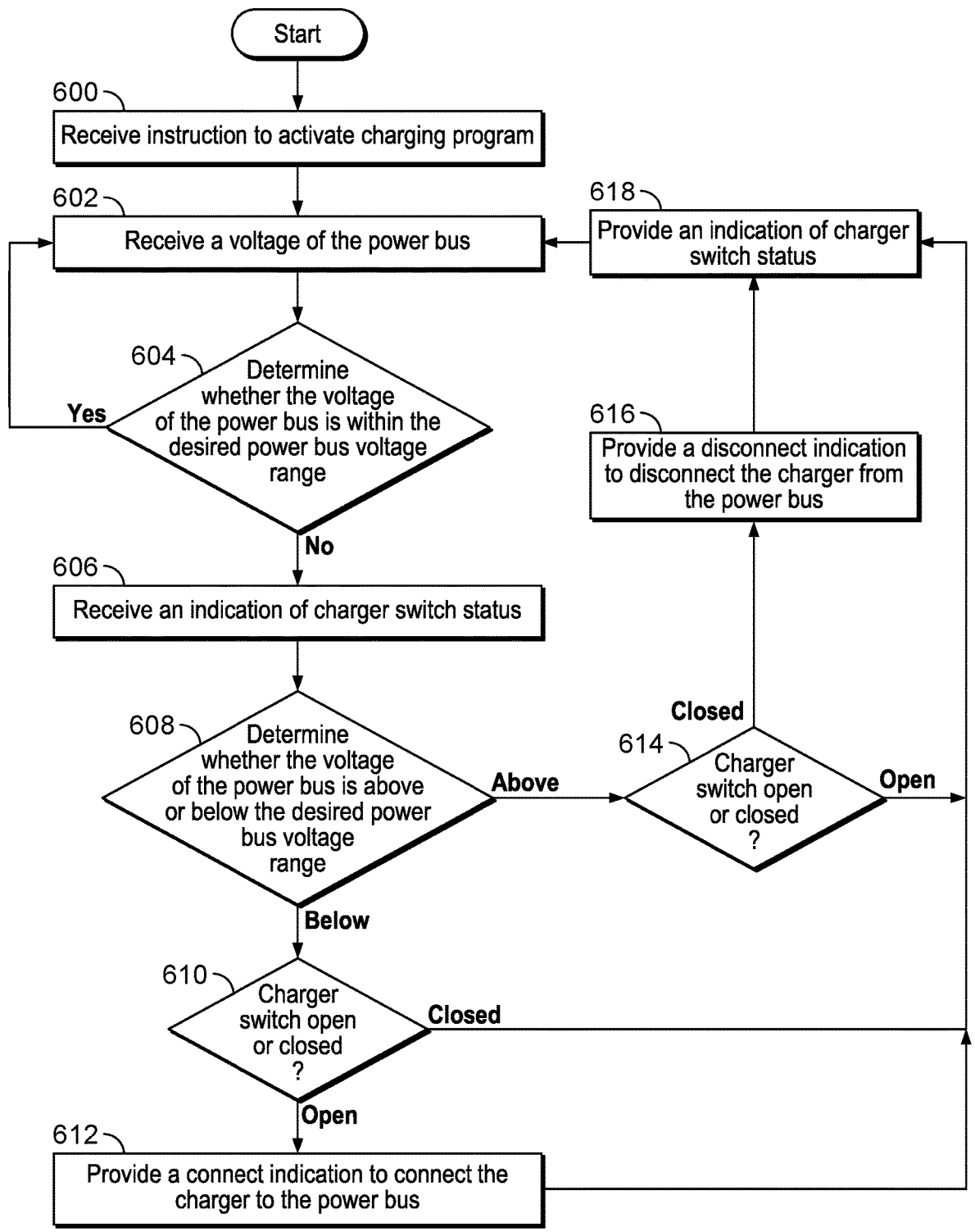
FIG. 6 is a flow diagram illustrating an embodiment of a method for charging a battery system.

FIG. 6 is a flow diagram illustrating an embodiment of a method for charging a battery system. In some embodiments, the process of FIG. 6 is executed using master battery pack 401 of FIG. 4A. In some embodiments, the process of FIG. 6 utilizes a solar charger (e.g., solar charger 402 of FIG. 4A) supplied by photovoltaic panels (e.g., one or more of solar panel 6, solar panel 8, or solar panel 10 of FIG. 1A).

In various embodiments, the process of FIG. 6 utilizes an external charger (e.g., a trickle charger, a fast charger, an intelligent charger, a pulse charger, a portable charger, a diesel-powered charger, a solar-powered charger, or any other appropriate type of charger). In some embodiments, the external charger (i.e., external to the battery system) is connected to the power bus through an empty power bus connector on a last slave pack in the set of battery packs (e.g., a power bus expansion node). In some embodiments, the external charger comprises a switch used to connect or disconnect the external charger from the power bus (e.g., a manual switch or a remotely controllable switch). In various embodiments, connecting or disconnecting the external charger is done remotely (e.g., using signals transmitted to the external charger via a communication bus) or manually (e.g., by a system operator as instructed via a user display).

In the example shown, the process of FIG. 6 is used for charging one or more battery packs. In various embodiments, the battery packs comprise a master battery pack and one or more slave battery packs. In some embodiments, charging is determined and controlled by firmware encoded into the master pack sensor board processor (e.g., using a state machine).

In the example shown, in 600, an instruction is received to activate the charging program. For example, a system operator instructs a master battery pack via a user interface or a communication bus to activate the charging program. In some embodiments, the user interface comprises a manual switch to activate the charging program. In some embodiments, the activation instruction is provided by user input to a computer and transmitted to the master battery pack via a communication bus or by any other appropriate means (e.g., ethernet connection, wireless network, cloud-based network, etc.). In some embodiments, the decision to activate the charging program is performed by a state machine encoded into the firmware of the master pack sensor board processor.

In 602, a voltage of the power bus is received. For example, a voltage measurement of the power bus is made by an on-board voltage sensor in the master battery pack and communicated to the sensor board of the master battery pack.

In 604, it is determined whether the voltage of the power bus is within the desired power bus voltage range. For example, a sensor board processor of the master battery pack compares the power bus voltage to the required voltage range (e.g., the nominal voltage range) to operate a load (e.g., a sensor-based monitoring system).

In response to determining the voltage of the power bus is within the desired power bus voltage range, control passes back to 602. In this instance, there is no need to charge the battery system and the process loops until charging is needed. For example, the power bus voltage is measured on a periodic basis, as determined by the firmware operating on the master pack sensor board, until the voltage falls outside of the desired power bus voltage range.

In 606, an indication of charger switch status is received. For example, the presence or absence of a control signal applied to the charger switch is used to determine charger switch status (i.e., whether the charger switch is open or closed) and the status is communicated to, and received by, the sensor board of the master battery pack (e.g., via a communication bus). For a manual switch on an external charger, the system operator visually determines switch status and the status is communicated via a user input to the sensor board of the master battery pack.

In 608, it is determined whether the voltage of the power bus is above or below the desired power bus voltage range. For example, if the voltage of the power bus is below the desired power bus voltage range, then charging is required, but if the voltage of the power bus is above the desired power bus voltage range, then further charging is not required.

In response to the voltage of the power bus being below the desired power bus voltage range, control passes to 610. In 610, it is determined whether the charger switch is open or closed. For example, the presence or absence of a control signal applied to the charger switch is used to determine whether the charger switch is open or closed; for a manual switch on an external charger, the system operator visually determines switch status.

In response to the charger switch being open, control passes to 612. In 612, a connect indication is provided to connect the charger to the power bus. For example, a sensor board of the master battery pack transmits a signal: (i) to close a switch connecting either one or more solar panels to a solar charger of the master battery pack; (ii) to close a switch connecting an external charger to the power bus; (iii) or to instruct a system operator (e.g., via a user display) to close a switch (e.g., a manual switch) connecting an external charger to the power bus.

In response to connecting the charger to the power bus, control passes to 618. In 618, an indication is provided of charger switch status. In this instance, a closed indication is provided to the sensor board of the master battery pack and control passes back to 602 to provide for monitoring of power bus voltage during charging. For example, the presence or absence of a control signal applied to the charger switch is used to determine charger switch status and the status is communicated to the sensor board of the master battery pack. For a manual switch on an external charger, the system operator visually determines switch status and the status is communicated via a user input to the sensor board of the master battery pack.

In response to the charger switch of 610 being closed, control passes to 618. In 618, an indication is provided of charger switch status. In this example, a closed indication is provided to the sensor board of the master battery pack and control passes to 602, and the process loops. In this instance, the battery system requires charging until it is determined that the voltage of the power bus is above the desired power bus voltage range.

In 608, in response to the voltage of the power bus being above the desired power bus voltage range, control passes to 614. In 614, it is determined whether the charger switch is open or closed. For example, the presence or absence of a control signal applied to the charger switch is used to determine whether the charger switch is open or closed; for a manual switch on an external charger, the system operator visually determines switch status. In response to the charger switch being closed, control passes to 616.

In 616, a disconnect indication is provided to disconnect the charger from the power bus. For example, a sensor board of the master battery pack transmits a signal: (i) to open a switch connecting either one or more solar panels to a solar charger of the master battery pack; (ii) to open a switch connecting an external charger to the power bus; (iii) or to instruct a system operator (e.g., via a user display) to open a switch (e.g., a manual switch) connecting an external charger to the power bus. In this example, the battery system does not require charging until it is determined that the voltage of the power bus is below the desired power bus voltage range.

In response to disconnecting the charger from the power bus, control passes to 618. In 618, an indication is provided of charger switch status. For example, the presence or absence of a control signal applied to the charger switch is used to determine whether the charger switch is open or closed; for a manual switch on an external charger, the system operator visually determines switch status. In this instance, an open indication is provided to the sensor board of the master battery pack and control passes back to 602 to provide for monitoring of power bus voltage (e.g., during discharge while powering an external load).

Figure 7:
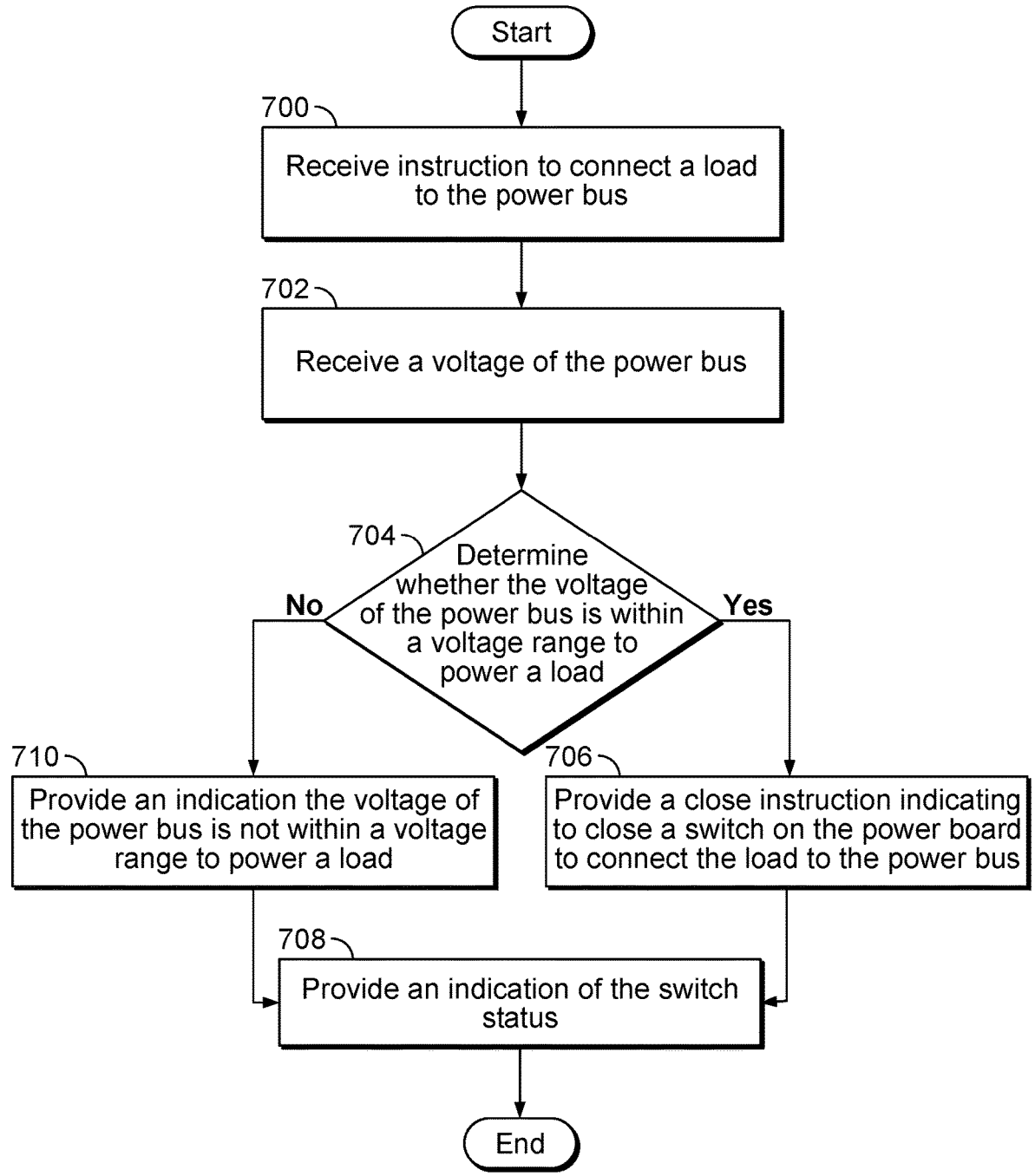
FIG. 7 is a flow diagram illustrating an embodiment of a method for connecting a load to a power bus.

FIG. 7 is a flow diagram illustrating an embodiment of a method for connecting a load to a power bus. In some embodiments, the process of FIG. 7 is executed using master battery pack 401 of FIG. 4A. In some embodiments, the process of FIG. 7 is executed using a computer program. In various embodiments, the process of FIG. 7 is executed using any appropriate combination of a master battery pack and a computer program. In some embodiments, the process of FIG. 7 is used to connect load 12 to battery system 2 of FIG. 1A. In some embodiments, the process of FIG. 7 is used to connect a load via load connector 480 and sensor-board controlled switch 474 of FIG. 4C.

In 700, an instruction to connect a load to the power bus is received. For example, a system operator instructs a master battery pack via a user interface or a communication bus to connect a load to the power bus. In some embodiments, the user interface comprises a manual switch to connect a load to the power bus. In some embodiments, the instruction to connect a load to the power bus is provided by user input to a computer and transmitted to the master battery pack via a communication bus or by any other appropriate means (e.g., ethernet connection, wireless network, cloud-based network, etc.). In some embodiments, the decision to connect a load to the power bus is performed and indicated by a computer program.

In 702, a voltage of the power bus is received. For example, a voltage measurement of the power bus is made by an on-board voltage sensor in the master battery pack and communicated to the sensor board of the master battery pack and/or to a computer.

In 704, it is determined whether the voltage measurement indicates that the power bus is within a voltage range to power a load. For example, a sensor board processor of the master battery pack, or a computer program, compares the power bus voltage to the required voltage range (e.g., the nominal voltage range) to operate a load (e.g., a sensor-based monitoring system). In response to determining the voltage measurement indicates that the power bus is within a voltage range to power a load, control passes to 706.

In 706, a close instruction is provided indicating to close a switch on the power board to connect the load to the power bus. For example, a sensor board processor of the master battery pack, or a computer program, indicates to close a sensor-board controlled switch to connect the load to the power bus.

In 708, an indication of the switch status is provided, and the process ends. For example, the presence or absence of a control signal applied to the load switch is used to determine charger switch status (i.e., whether the charger switch is open or closed) and the status is provided to the sensor board of the master battery pack and/or a computer (e.g., via a communication bus).

In response to determining the voltage measurement indicates that the power bus is not within a voltage range to power a load, control passes to 710. In 710, an indication is provided that the voltage of the power bus is not within a voltage range to power a load, and control passes to 708. For example, an indication that the power bus is not within a voltage range to power a load is provided to a system operator via a computer display. In 708, an indication of the switch status is provided, and the process ends. For example, in the case where the power bus is not within a voltage range to power a load, an indication should be provided that the load switch is open (e.g., to prevent under or overpowering the load). In another example, for the case where the load switch is indicated to be closed due to a system or component malfunction, the system operator or a computer program would indicate to disconnect the load (e.g., by opening a circuit breaker).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A battery system, comprising:
    a power bus; and
    a set of battery packs, wherein a battery pack of the set of battery packs comprises one or more batteries and a sensor board, wherein the power bus is used to electrically connect the set of battery packs, and wherein the sensor board comprises a processor configured to:
        receive a voltage difference between a battery pack of the set of battery packs and the power bus, wherein the battery pack is not connected to the power bus;
        determine whether the voltage difference is within a threshold voltage difference;
        in response to determining the voltage difference is not within the threshold voltage difference, provide a drain indication to drain off the battery pack using a power draw mechanism until the voltage difference is within the threshold voltage difference; and
    provide a connect indication to connect the battery pack to the power bus.

2. The battery system of claim 1, wherein the set of battery packs includes a master battery pack and one or more slave battery packs.

3. The battery system of claim 2, wherein the master battery pack includes a charging unit.

4. The battery system of claim 3, wherein the charging unit receives power from one or more solar panels.

5. The battery system of claim 1, wherein the sensor board comprises a voltage sensor and a voltage difference calculator used to determine the voltage difference between the battery pack and the power bus.

6. The battery system of claim 1, wherein the processor is further configured to provide the connect indication to connect the battery pack to the power bus by indicating to close an electrical contactor.

7. The battery system of claim 1, wherein the battery pack comprises a power board including one or more electrical contactors.

8. The battery system of claim 7, wherein an electrical contactor of the one or more electrical contactors is used to connect or disconnect a master battery pack or one or more slave battery packs to or from the power bus.

9. The battery system of claim 8, wherein the master battery pack includes a charging unit, and wherein an other electrical contactor of the one or more electrical contactors is used to connect or disconnect the charging unit to or from the power bus.

10. The battery system of claim 1, wherein the power draw mechanism comprises a bleed resistor, wherein the bleed resistor bleeds excess energy in the form of heat.

11. The battery system of claim 10, wherein the heat is used to reach a target operating temperature specific to the battery pack.

12. The battery system of claim 1, further comprising a communication bus.

13. The battery system of claim 1, wherein the set of battery packs comprises modular battery packs.

14. The battery system of claim 13, wherein each of the modular battery packs comprises one or more battery cells.

15. The battery system of claim 14, wherein a modular battery pack of the modular battery packs comprises a battery management unit.

16. The battery system of claim 15, wherein the battery management unit balances voltages across battery cells of the modular battery packs.

* * * * *